US012653083B2

(12) United States Patent
Knoblauch

(10) Patent No.: US 12,653,083 B2
(45) Date of Patent: Jun. 16, 2026

(54) SYSTEM AND METHOD FOR DETECTING BOLT SHEAR IN A SHANK ASSEMBLY OF AN AGRICULTURAL IMPLEMENT

(71) Applicant: CNH Industrial America LLC, New Holland, PA (US)

(72) Inventor: Joshua David Knoblauch, Lowpoint, IL (US)

(73) Assignee: CNH Industrial America LLC, New Holland, PA (US)

( * ) Notice: Subject to any disclaimer, the term of this patent is extended or adjusted under 35 U.S.C. 154(b) by 486 days.

(21) Appl. No.: 18/198,201

(22) Filed: May 16, 2023

(65) Prior Publication Data

US 2024/0381802 A1     Nov. 21, 2024

(51) Int. Cl.
*A01B 35/32* (2006.01)
*A01B 35/06* (2006.01)
*A01B 61/04* (2006.01)

(52) U.S. Cl.
CPC ............ *A01B 61/042* (2013.01); *A01B 35/06* (2013.01); *A01B 35/32* (2013.01)

(58) Field of Classification Search
CPC ....... A01B 61/00; A01B 61/04; A01B 61/042; A01B 61/044; A01B 35/06; A01B 35/24; A01B 35/32

USPC .................................................. 172/271, 261
See application file for complete search history.

(56) References Cited

U.S. PATENT DOCUMENTS

| | | | |
|---|---|---|---|
| 11,015,993 B2 | 5/2021 | Glovier et al. | |
| 11,506,723 B2 | 11/2022 | Stanhope et al. | |
| 2017/0196160 A1* | 7/2017 | Bjerketvedt | A01B 15/02 |
| 2022/0322597 A1* | 10/2022 | Harmon | A01B 61/044 |

FOREIGN PATENT DOCUMENTS

JP          7039453 B2     3/2022

* cited by examiner

*Primary Examiner* — Christopher J Sebesta
*Assistant Examiner* — Evan A Bregel
(74) *Attorney, Agent, or Firm* — Fletcher Yoder, P.C.

(57) ABSTRACT

An agricultural system includes a tillage implement with a frame, a shank mount coupled to or integrally formed with the frame, a rotary sensor coupled to the shank mount, and a shank coupled to a bracket via a first fastener. The tillage implement also includes a rod assembly with a first end portion coupled to the bracket via a shear bolt that is configured to shear upon contact by the shank and a second end portion coupled to a rotary shaft of the rotary sensor.

20 Claims, 6 Drawing Sheets

SYSTEM AND METHOD FOR DETECTING BOLT SHEAR IN A SHANK ASSEMBLY OF AN AGRICULTURAL IMPLEMENT

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A tillage system may be used to cultivate soil through tilling operations. Common tilling operations include plowing, harrowing, sub-soiling, and vertical tillage. The tillage system may include disc blades that are positioned vertically on a tillage implement to cut into the soil and crop residue from previous agricultural operations. The disc blades chop up the crop residue and help incorporate the crop residue within the soil to aid in decomposition and to add nutrients for future crop growth. A farmer may perform the tilling operations by pulling the tilling implement behind a motorized tractor. Depending on crop selection and soil conditions, the farmer may perform several tilling operations at different times over a crop cycle.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments, an agricultural system includes a tillage implement with a frame, a shank mount coupled to or integrally formed with the frame, a rotary sensor coupled to the shank mount, and a shank coupled to a bracket via a first fastener. The tillage implement also includes a rod assembly with a first end portion coupled to the bracket via a shear bolt that is configured to shear upon contact by the shank and a second end portion coupled to a rotary shaft of the rotary sensor.

In some embodiments, a tillage implement includes a frame, a shank mount coupled to or integrally formed with the frame, and a shank coupled to a bracket via a first fastener. The tillage implement also includes a sensor assembly with a rotary sensor coupled to the shank mount and a rod assembly coupled to the bracket via a shear bolt. The shear bolt is configured to shear upon contact by the shank and coupled to the rotary sensor.

In some embodiments, a method of operating an agricultural system includes shearing, with a shank configured to engage soil in a field during tillage operations, a shear bolt that couples a rod assembly to a bracket. The method also includes rotating, via rotation of a rod of the rod assembly due to shearing of the shear bolt, a rotary shaft of a rotary sensor. The method further includes providing, via a display device, an output indicative of an occurrence of shank displacement in response to the rotating of the rotary shaft of the rotary sensor.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
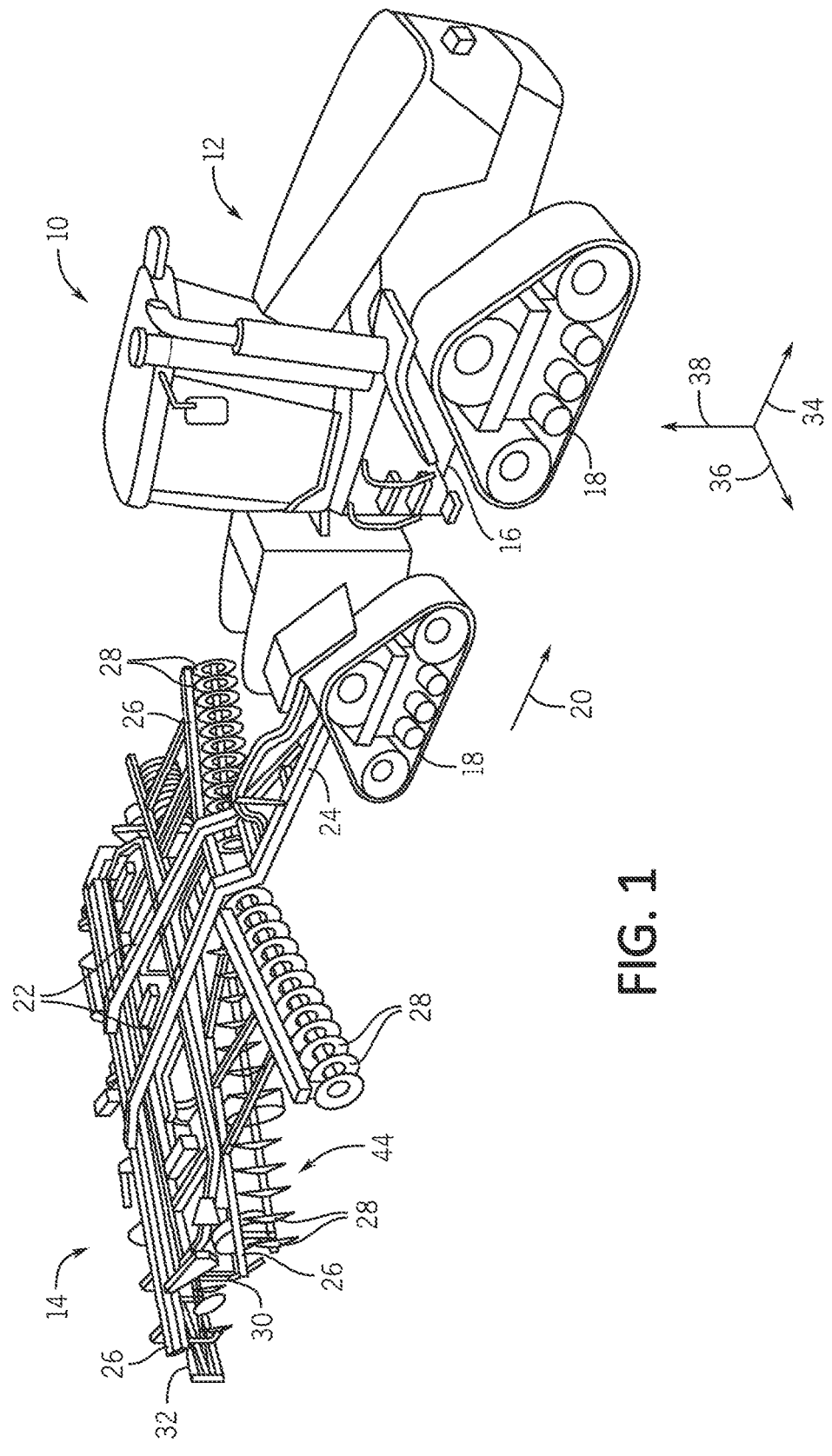
FIG. 1 is a perspective view of an agricultural system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure relates generally to an agricultural system. More specifically, the present disclosure relates to a tillage implement that includes a rotary sensor positioned to detect shearing of a shear bolt in a shank assembly.

A tillage implement may be used to aid in a decomposition process for crop residue that remains in a field following a harvesting operation. The tillage implement may be pulled behind a work vehicle, and disc blades of the tillage implement may cut up the crop residue and incorporate the crop residue into soil in the field. The tillage implement may also include shank assemblies, which each include a shank with a shank tip that moves through the soil to prepare the soil for future planting operations (e.g., remove a lower compaction layer; working depth of about 15 to 35 centimeters). During tillage operations, it is possible that a fastener that rotatably couples the shank to a bracket may break or otherwise fail (e.g., under certain conditions, such as impact or contact between the shank and objects in the field). As a result, the shank may float over the soil and/or dig into the soil at undesirable depths, which may cause varying depths of the shank tip and create uneven tillage across the field.

Accordingly, embodiments of the present disclosure includes a shear bolt that connects a rod assembly to the bracket. When the fastener that rotatably couples the shank to the bracket breaks or fails, the shank may contact and shear the shear bolt. As a result, the rod assembly may separate from and move relative to the bracket. A rotary sensor is coupled to the rod assembly and is configured to provide an output (e.g., sensor data) that indicates the movement of the rod assembly, which in turn indicates the shearing of the shear bolt and the breakage or failure of the fastener that rotatably couples the shank to the bracket.

With the foregoing in mind, FIG. 1 is a perspective view of an embodiment of an agricultural system 10 that includes a work vehicle 12 and a tillage implement 14. In FIG. 1, the work vehicle 12 is positioned to the tow the tillage implement 14 (e.g., across a field), and the tillage implement 14 is configured as a disk ripper. However, it should be appreciated that the tillage implement 14 may have any suitable configuration that supports components and/or operations described herein.

As shown, the work vehicle 12 includes a chassis 16 and drive assemblies 18 (e.g., tracks) that are configured to move the work vehicle 12 in a forward direction of travel 20 (e.g., relative to a ground surface of the field). Further, the tillage implement 14 includes a frame 22 that is coupled to the chassis 16 via a tow bar 24. The frame 22 may include multiple frame members 26 (e.g., beams, bars) that support multiple tillage tools, such as multiple disk blades 28, multiple shanks 30, multiple basket assemblies 32, and/or other tillage tools (e.g., spikes, tines, leveling blades). It should be appreciated that the tillage implement 14 may include any suitable combination of tillage tools. The multiple tillage tools may be configured to engage soil and/or crop residue in the field to perform a tillage operation as the work vehicle 12 pulls the tillage implement 14 across the field. To facilitate discussion the agricultural system 10 and its components may be described with reference to a longitudinal axis or direction 34, a lateral axis or direction 36, and/or a vertical axis or direction 38.

Figure 2:
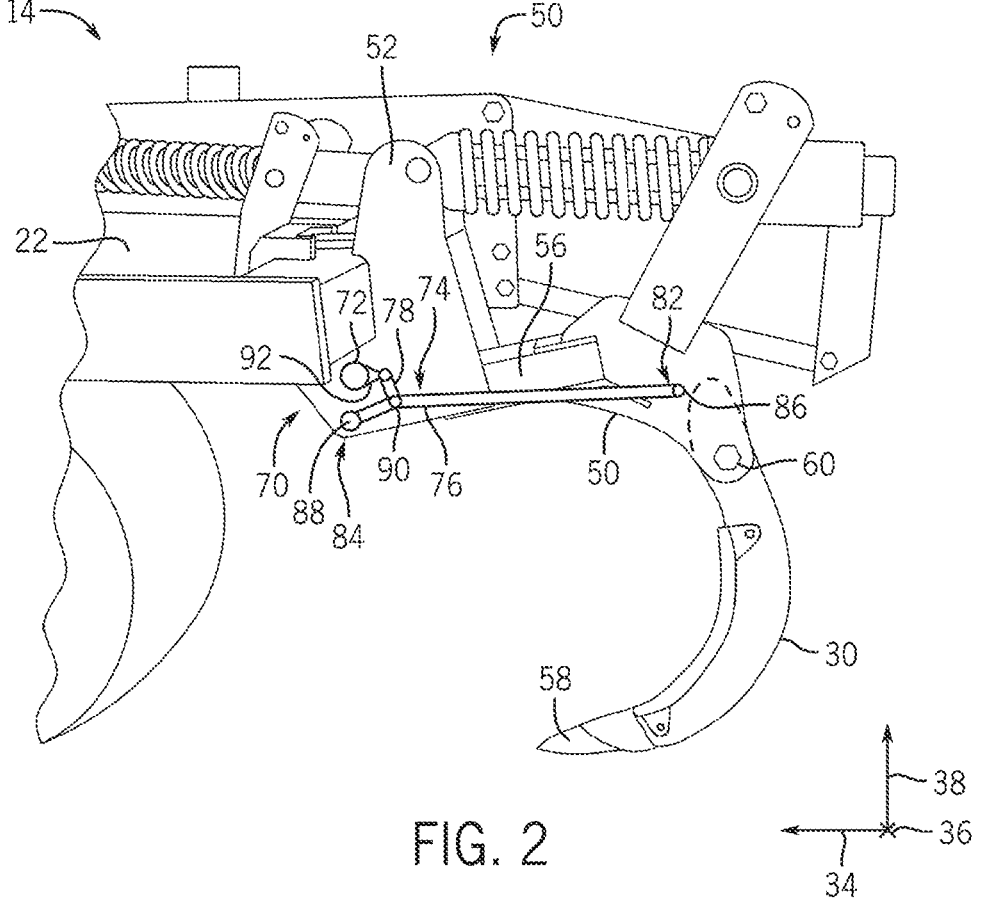
FIG. 2 is a side view of a shank assembly that may be employed within a tillage implement of the agricultural system of FIG. 1, in accordance with an embodiment of the present disclosure.

FIG. 2 is a side view of an embodiment of a shank assembly 50 that may be employed within the tillage implement 14. The shank assembly 50 may be considered to include the shank 30, a shank mount 52, a bracket 54, and an arm 56. The shank 30 may include or be coupled to a shank tip 58 that is configured to engage the soil and/or the crop residue in the field, and the shank 30 may be rotatably coupled to the bracket 54 via a fastener 60 (e.g., bolt). The bracket 54 may be coupled (e.g., rotatably or rigidly) to the shank mount 52 via the support arm 56, and the shank mount 52 may be integrally formed with and/or coupled (e.g., rotatably or rigidly) to the frame 22 of the tillage implement 14.

As shown, a sensor assembly 70 includes a rotary sensor 72 and a rod assembly 74. The rod assembly 74 includes a rod 76 and a linkage 78. The rod assembly 74 extends from a first end 82 (e.g., first end portion) to a second end 84 (e.g., second end portion), wherein the first end 82 is coupled (e.g., rotatably or rigidly) to the bracket 54 via a shear bolt 86 and the second end 84 is coupled (e.g., rotatably or rigidly) to the shank mount 52 via a fastener 88 (e.g., pin). Additionally, the second end 84 (e.g., between the first end 82 and the fastener 88) includes a rotatable connection between the rod 76 and the linkage 78 via a fastener 90 (e.g., pin). The linkage 78 is also coupled (e.g., rotatably) to a sensor shaft 92 (e.g., input component) of the rotary sensor 72. The rotary sensor 72 is configured to output a signal (e.g., data; voltage) indicative of a position and/or a rotation of the sensor shaft 92.

Figure 3:
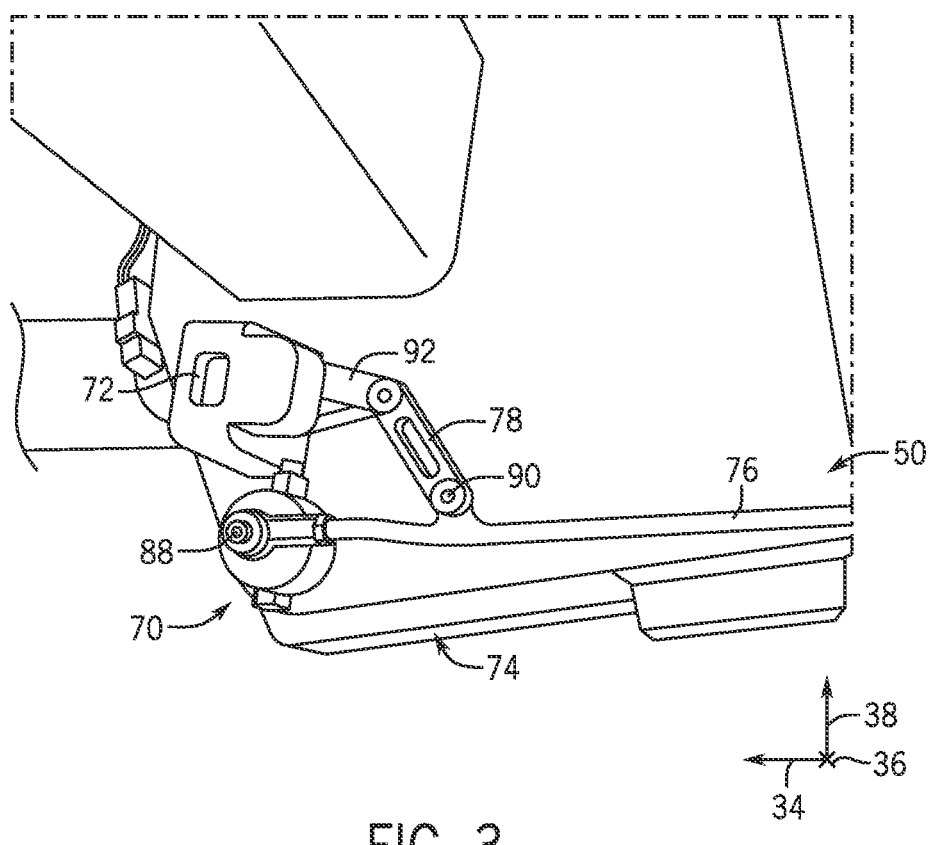
FIG. 3 is a side view of a portion of the shank assembly of FIG. 2, wherein a rotary sensor is coupled to a first end portion of a rod assembly, in accordance with an embodiment of the present disclosure.
Figure 4:
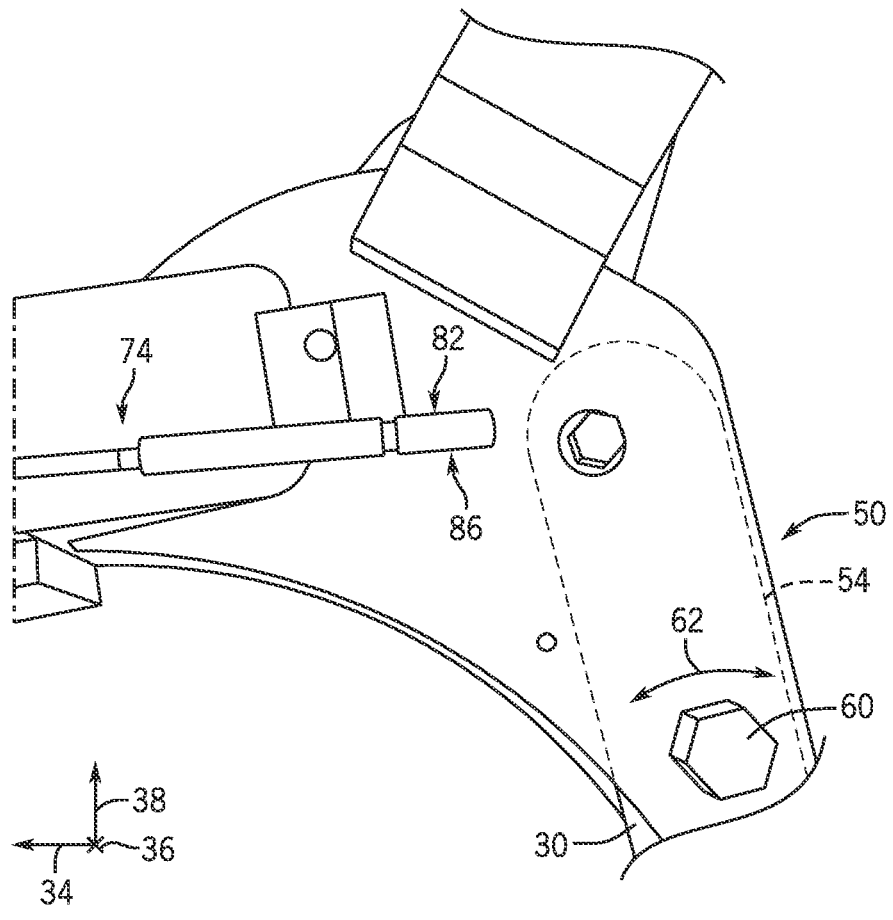
FIG. 4 is a side view of a portion of the shank assembly of FIG. 2, wherein a shear bolt is coupled to a second end portion of the rod assembly, in accordance with an embodiment of the present disclosure.

FIGS. 3 and 4 provide additional details and clarity with respect to certain features of the shank assembly 50. In particular, FIG. 3 is a side view of an embodiment of a portion of the shank assembly 50 with the sensor assembly 70. As shown, the sensor assembly 70 includes the rotary sensor 72 and the rod assembly 74. The rod assembly 74 includes the rod 76 and the linkage 78. The second end 84 of the rod assembly 74 is coupled to the shank mount 52 via the fastener 88. Additionally, the rod 76 is coupled to the linkage 78 via the fastener 90. The linkage 78 is also coupled to the sensor shaft 92 of the rotary sensor 72.

FIG. 4 is a side view of a portion of the shank assembly 50, wherein the first end 82 of the rod assembly 74 is coupled to the bracket 54 via the shear bolt 86. During tillage operations, the shank 30 may rotate relative to the bracket 54 at the fastener 60, as indicated by arrows 62. It is possible that the fastener 60 may break or otherwise fail to support the shank 30, such as due to contact between the shank 30 and an object in the field (e.g., rock) or for any of a variety of other reasons. In such cases, the shank 30 may move relative to the bracket 54 (e.g., upward and/or forward) and contact the shear bolt 86 that couples the first end 82 of the rod assembly 74 to the bracket 54.

Figure 5:
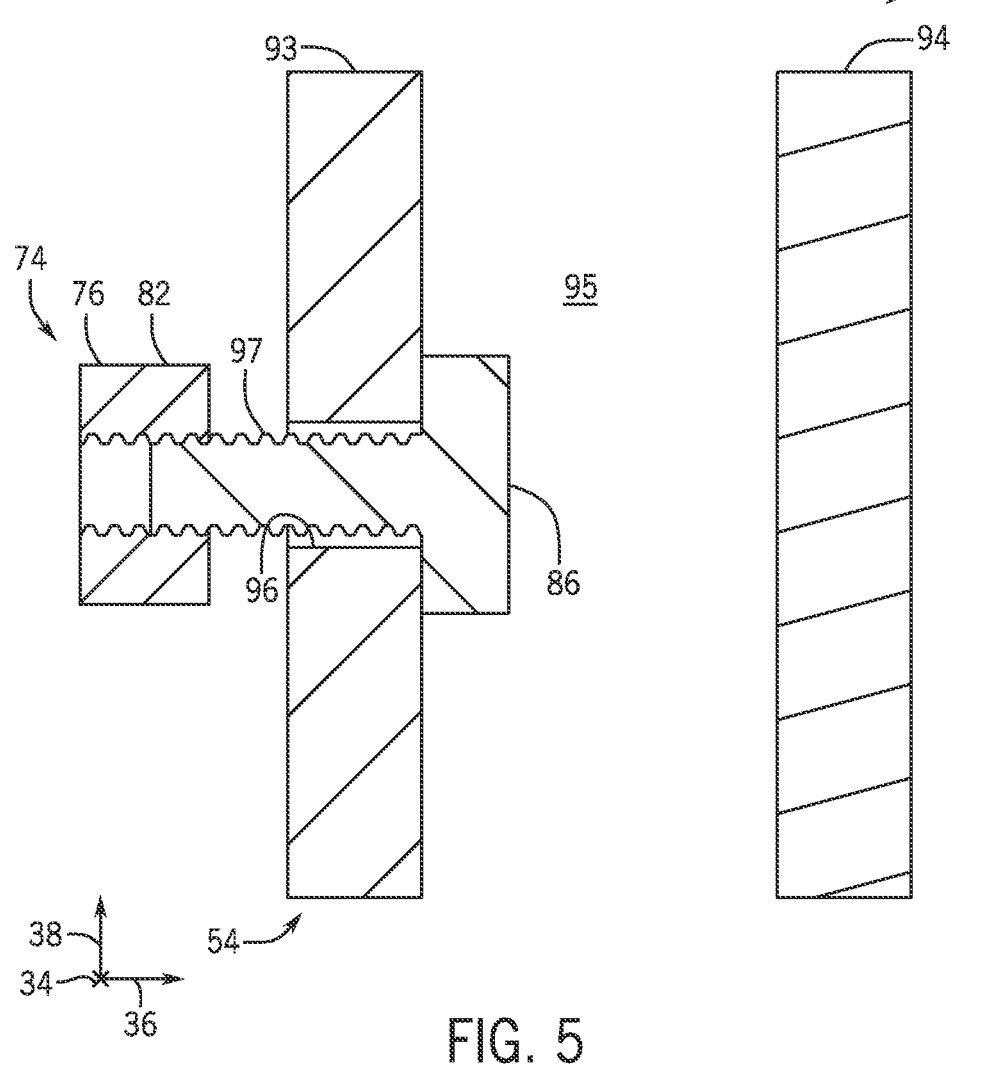
FIG. 5 is a rear view of a portion of the shank assembly of FIG. 2, wherein the shear bolt extends through a plate, in accordance with an embodiment of the present disclosure.

With reference to FIG. 5, which is a rear view of an embodiment of a portion of the shank assembly 50, the shear bolt 86 extends through at least a first plate 93 of the bracket 54 to couple the first end 82 of the rod assembly 74 (e.g., the rod 76) to the bracket 54. In response to the contact between the shank 30 (FIGS. 1, 2, and 4) and the shear bolt 86, the shear bolt 86 may break and cause the first end 82 of the rod assembly 74 to separate (e.g., physically separate; lose contact; release; fall toward a ground surface) from the bracket 54.

While the shear bolt 86 is shown as extending through only the first plate 93 of the bracket 54, it should be appreciated that the shear bolt 86 may instead extend through both the first plate 93 of the bracket 54 and a second plate 94 (e.g., opposed to the first plate; parallel to one another) of the bracket 54. Such a configuration may increase a likelihood of contact between the shank 30 and the shear bolt 86 following the break of the fastener 60 (FIGS. 1, 2, and 4) or other failure that causes the shank 30 to move relative to the bracket 54 (e.g., movement other than expected rotation about the fastener 60 during the tillage operations). For example, the shank 30 may be rotatably supported on the first plate 93 and the second plate 94 of the bracket 54 (e.g., in a lateral gap 95 defined between the first plate 93 and the second plate 94 of the bracket 54), and following the break of the fastener 60 or other failure, the shank 30 may move through the lateral gap 95 to contact the shear bolt 86 that couples the first end 82 of the rod assembly 74 to the bracket 54. While embodiments herein describe the shank 30 as being configured to rotate about the fastener 60 during the tillage operations, it should be appreciated that the techniques described herein (e.g., detection of shearing of the shear bolt 86) may be utilized with a rigid shank construction in which the shank 30 is not configured to move relative to the bracket 54 during the tillage operations.

As shown in FIG. 5, the shear bolt 86 may extend through an opening 96 (e.g., through hole) in the first plate 93. A bolt diameter (e.g., outer diameter) of a shaft portion 97 of the shear bolt 86 is less than an opening diameter (e.g., inner diameter) of the opening 96 (e.g., undersized; the bolt diameter may be approximately or less than 95, 90, 85, 80, or 75 percent than the opening diameter). Such a configuration may facilitate efficient and complete separation of the rod assembly 74 from the bracket 54 upon shearing of the shear bolt 86.

Figure 6:
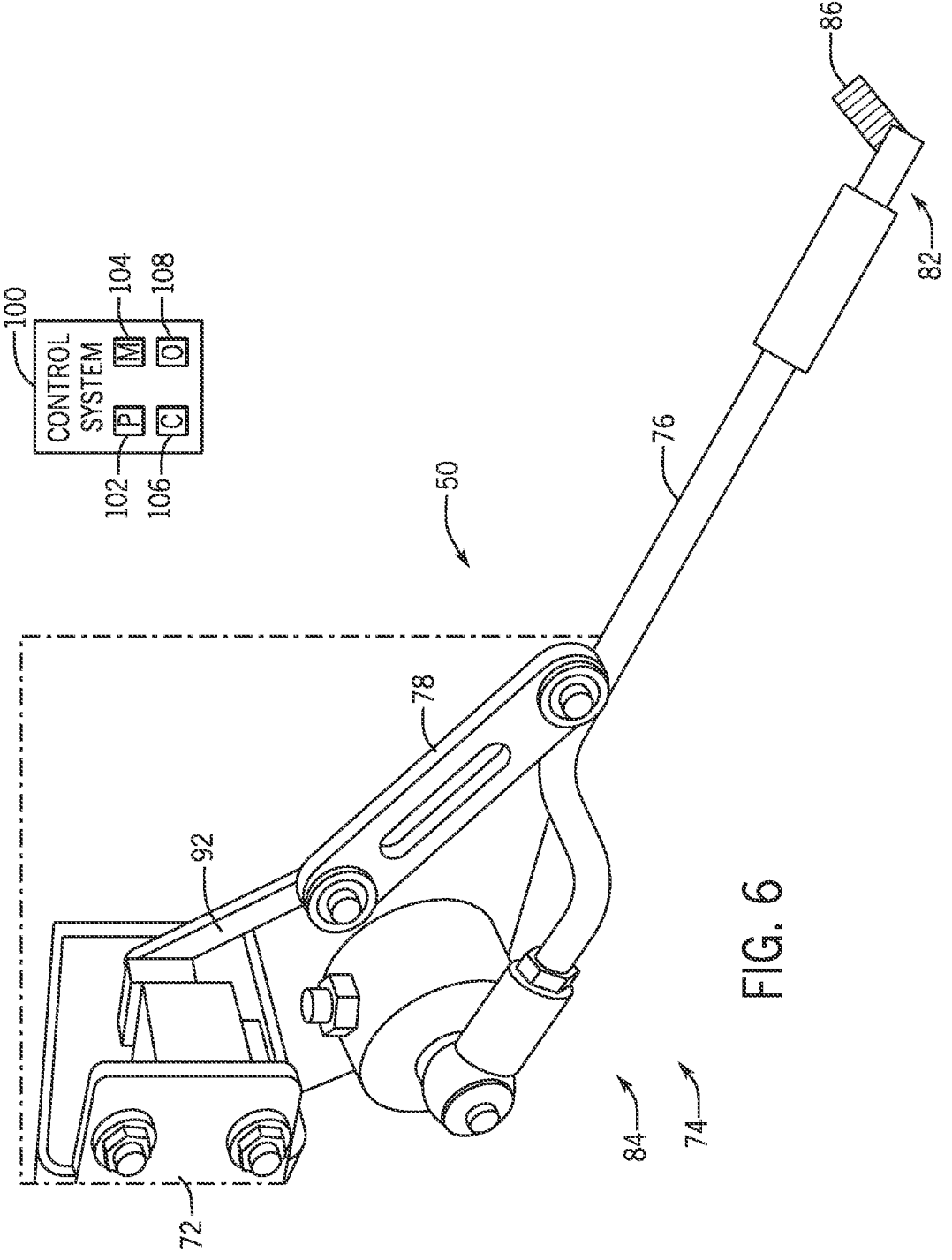
FIG. 6 is perspective view of a portion of the shank assembly of FIG. 2, wherein the rotary sensor is tripped via the rod assembly, which indicates shearing of the shear bolt, in accordance with an embodiment of the present disclosure.

FIG. 6 is perspective view of an embodiment of a portion of the shank assembly 50, wherein the rotary sensor 72 is tripped via the rod assembly 74, which indicates shearing of the shear bolt 86. As shown, the first end 82 of the rod assembly 74 is separated from the bracket 54 (FIGS. 2, 4, and 5), which causes rotation at the second end 84 of the rod assembly 74. The rotation of the rod 76 at the second end 84 of the rod assembly 74 drives the linkage 78, which in turn drives the sensor shaft 92. The rotary sensor 72 is configured to output the signal (e.g., data; voltage) indicative of the position and/or the rotation of the sensor shaft 92. Thus, the signal is also indicative of shearing of the shear bolt 86 via the shank 30 (e.g., FIGS. 2, 4, and 5).

The rotary sensor 72 may be communicatively coupled to a control system 100 (e.g., electronic control system). The control system 100 may include a processor 102 (e.g., processing circuitry), a memory device 104, a communication device 106, and an output device 108 (e.g., display and/or speaker). The processor 102 may be used to execute software code or instructions stored on the memory device 104, such as to process the signal from the rotary sensor 72, control operations of the tillage implement 14, or both. The memory device 104 may store processor-executable software code or instructions (e.g., firmware or software), which are tangibly stored on a non-transitory computer readable medium. As an example, the memory device 104 may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, the processor 102 may include multiple microprocessors, one or more "general-purpose" microprocessors, one or more special-purpose microprocessors, and/or one or more application specific integrated circuits (ASICS), or some combination thereof. For example, the processor 102 may include one or more reduced instruction set (RISC) or complex instruction set (CISC) processors. The processor 102 and/or the memory device 104 may be located in any suitable portion of the agricultural system 10 of FIG. 1. Further, the control system 100 may be a distributed control system with the multiple processors 102 and/or the multiple memories 104 in separate housings or locations (e.g., in the agricultural system 10, in a remote location that is physically separate from the agricultural system 10, part of a cloud computing system).

The communication device 106 may be configured to communicate (e.g., wirelessly or via wired connections) with the rotary sensor 72 and/or with one or more additional devices (e.g., other control systems associated with the agricultural system 10). Further, the communication device 106 may include multiple communication devices 106, such as when the control system 100 is the distributed control system. The output device 108 may include a display that is configured to provide visual outputs to an operator of the agricultural system 10 and/or a speaker that is configured to provide audible outputs to the operator of the agricultural system 10. In some embodiments, the output device 108 may be located in a cab of the work vehicle 12 of FIG. 1, although the output device 108 may include one or more output devices 108 in any suitable location (e.g., on the tillage implement 14; in a remote location that is physically separate from the agricultural system 10).

In operation, the control system 100 may receive and process the signal from the rotary sensor 72 during the tillage operations. The control system 100 may determine that the signal from the rotary sensor 72 reflects a voltage level that is over a voltage threshold that indicates rotation of the sensor shaft 92 in a manner consistent with (e.g., expected with) shearing of the shear bolt 86 and separation of the rod 76 from the bracket 54. Then, the control system 100 may provide an output or an alarm via the output device 108. For example, the control system 100 may instruct the display device to display a text message with a recommendation to temporarily stop the tillage operations to repair the shank 30, to repair the shank 30 at completion of the tillage operations, and so forth. In some embodiments, the control system 100 may instruct the display device to display an image (e.g., photo or schematic) of the tillage implement 14 with a highlight of the shank 30 that sheared the shear bolt 86. In this way, the image may enable the operator to visualize a location for the repair, which may enable the operator to efficiently complete the repair, for example. In any case, the control system 100 may instruct the display device to display the text message and/or the image as part of a pop-up window on the display device (e.g., to overlay default or currently displayed information) to draw attention of the operator. Additionally or alternatively, the control system 100 may instruct the speaker to provide an audio output of spoken words with the recommendation, a beep or other alarm sound, and so forth.

With reference to FIGS. 1-6, it should be appreciated that the tillage implement 14 may include multiple shank assemblies 50 distributed across a width of the tillage implement 14. Each shank assembly 50 of the multiple shank assemblies 50 may include or be associated with a respective shank 30, a respective shank mount 52, a respective bracket 54, a respective arm 56, a respective rotary sensor 72, a respective rod assembly 74, a respective shear bolt 86, and respective fasteners 60, 88, 90. Accordingly, the control system 100 may be configured to independently monitor each shank assembly 50 of the multiple shank assemblies 50 and precisely identify when any particular shank 30 of the multiple shanks 30 shears its respective shear bolt 86.

As noted herein, the output or the alarm may reflect the particular shank 30 of the multiple shanks 30 that has sheared its respective shear bolt 86, such as by providing the highlight of the particular shank in the image or by providing location information (e.g., first shank on a left side). Further, the output or the alarm may vary based on a number of shanks 30 that have sheared their respective shear bolts 86. For example, the control system 100 may count the number of shanks that have sheared their respective shear bolts 86 and provide a numerical indicator of the number on the display device, add additional highlights to highlight any additional shanks 30 that have sheared their respective shear bolts 86 in the image, provide a first recommendation when the number of shanks 30 that have sheared their respective shear bolts 86 exceeds a first threshold (e.g., repair at end of the tillage operations), provide a second recommendation when a second number of shanks 30 that have sheared their respective shear bolts 86 exceeds a second threshold that is higher than the first threshold (e.g., stop the tillage operations to complete the repair), and so forth. In some embodiments, the control system 100 may provide other outputs to other devices, such as other outputs that adjust (e.g., stop) operation of a motor of the work vehicle 12, adjust (e.g., stop) operation of actuators of the tillage implement 14, and so forth, in response to determining that the signal from the rotary sensor 72 indicates rotation of the sensor shaft 92 due to the shearing of the shear bolt 86.

While only certain features have been illustrated and described herein, many modifications and changes will occur to those skilled in the art. It is, therefore, to be understood that the appended claims are intended to cover all such modifications and changes as fall within the true spirit of the disclosure. It should be appreciated that any features shown or described with reference to FIGS. 1-6 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural system, comprising:
a tillage implement, comprising:
    a frame;
    a shank mount coupled to or integrally formed with the frame;
    a rotary sensor coupled to the shank mount;
    a shank coupled to a bracket via a first fastener; and
    a rod assembly comprising a first end portion coupled to the bracket via a shear bolt that is configured to shear upon contact by the shank and a second end portion coupled to a rotary shaft of the rotary sensor, wherein the rod assembly comprises a rod that extends from a first end to a second end, and the first end is coupled to the bracket via the shear bolt and the second end is coupled to the shank mount via a second fastener.

2. The agricultural system of claim 1, wherein the bracket comprises a pair of opposed plates, and the shear bolt is positioned within a lateral gap defined between the pair of opposed plates.

3. The agricultural system of claim 2, wherein the shear bolt extends across the lateral gap and through a first plate and a second plate of the pair of opposed plates.

4. The agricultural system of claim 2, wherein the shank is rotatably coupled to the bracket via the first fastener and at least a portion of the shank is positioned in the lateral gap defined between the pair of opposed plates.

5. The agricultural system of claim 1, wherein the shank is rotatably coupled to the bracket via the first fastener.

6. The agricultural system of claim 1, wherein the rod assembly comprises a linkage that is rotatably coupled to the rod at a location between the first end of the rod and the second end of the rod, and the linkage is rotatably coupled to the rotary shaft of the rotary sensor.

7. The agricultural system of claim 1, wherein the shear bolt extends through an opening in the bracket, and a bolt diameter of the shear bolt is less than 90 percent of an opening diameter of the opening.

8. The agricultural system of claim 1, comprising a control system configured to receive signals from the rotary sensor, process the signals to identify an occurrence of shearing of the shear bolt, and provide an output indicative of the occurrence of the shearing of the shear bolt via an output device.

9. The agricultural system of claim 8, wherein the output comprises an image of the tillage implement with a highlight at a location of the shank in the image.

10. A tillage implement, comprising:
a frame;
a shank mount coupled to or integrally formed with the frame;
a shank coupled to a bracket via a first fastener; and
a sensor assembly, comprising:
    a rotary sensor coupled to the shank mount; and
    a rod assembly coupled to the bracket via a shear bolt and coupled to the rotary sensor, wherein the first fastener in an intact configuration enables the shank to rotate relative to the bracket without contact between the shank and the shear bolt during tillage operations, and the first fastener in a failed configuration causes the shank to contact and shear the shear bolt during the tillage operations.

11. The tillage implement of claim 10, wherein the bracket comprises a pair of opposed plates, and the shear bolt is positioned within a lateral gap defined between the pair of opposed plates.

12. The tillage implement of claim 10, wherein the rod assembly comprises a rod that extends from a first end to a second end, and the first end is coupled to the bracket via the shear bolt and the second end is coupled to the shank mount via a second fastener.

13. The tillage implement of claim 12, wherein the rod assembly comprises a linkage that is rotatably coupled to the rod at a location between the first end of the rod and the second end of the rod, and the linkage is rotatably coupled to the rotary sensor.

14. The tillage implement of claim 10, wherein the shear bolt extends through an opening in the bracket, and a bolt diameter of the shear bolt is less than 90 percent of an opening diameter of the opening.

15. The tillage implement of claim 10, wherein the shank extends from a first end to a second end that supports a shank tip, the shank comprises a proximal portion between the first end and the first fastener, and the shear bolt is positioned forward of a forward surface of the proximal portion of the shank relative to a forward direction of travel of the tillage implement.

16. The tillage implement of claim 10, wherein the shear bolt extends through an opening in the bracket and does not extend through the shank.

17. A method of operating an agricultural system, the method comprising:
rotating, via a first fastener that couples a shank to a bracket, the shank relative to the bracket as the shank engages soil in a field during tillage operations;
shearing, with the shank and upon failure of the first fastener, a shear bolt that couples a rod assembly to a bracket;
rotating, via rotation of a rod of the rod assembly due to shearing of the shear bolt, a rotary shaft of a rotary sensor; and
providing, via a display device, an output indicative of an occurrence of shank displacement in response to the rotating of the rotary shaft of the rotary sensor.

18. The method of claim 17, comprising processing, via a control system, sensor data from the rotary sensor to determine the occurrence of the shank displacement.

19. The method of claim 17, wherein the output comprises an image of a tillage implement of the agricultural system with a highlight at a location of the shank in the image.

20. The method of claim 17, wherein the rod extends from a first end to a second end, and the first end is coupled to the bracket via the shear bolt and the second end is coupled to a shank mount via a fastener.

\* \* \* \* \*